United States Patent Office 3,573,930
Patented Apr. 6, 1971

3,573,930
PREPARATION OF DRIED CHEESE
Robert F. Dale, Brookfield, Wis., assignor to Universal Foods Corporation, Milwaukee, Wis.
No Drawing. Filed Mar. 8, 1968, Ser. No. 711,516
Int. Cl. A23c *19/00*
U.S. Cl. 99—115                              11 Claims

ABSTRACT OF THE DISCLOSURE

A process for preparing dried cheese which comprises admixing a cheese with an emulsifier, extruding the cheese with a ram type extruder into elongated noodle form having a diameter of up to about $3/32$ inch, drying the extruded noodle at elevated temperatures of up to about 115° F. to a moisture content of up to about 17%. Cheeses which contain up to about 53% fat are adapted for processing to produce a dry storage stable product with essentially no fat separation and do not require refrigeration during storage.

CROSS REFERENCE TO RELATED APPLICATION

This invention is an improvement on the process disclosed in my copending application Serial Number 711,517 filed of even date herewith.

BACKGROUND OF THE INVENTION

Field of the invention

The invention relates to a process for preparing dried cheeses, especially those of high fat content, which dried cheese can be stored without refrigeration and is rehydratable to essentially its original flavor and texture. The product is free flowing and adapted for use in automatic dispensing equipment.

Description of the prior art

No successful process has been developed in the prior art to prepare a dried cheese for commercial or home use which is subsequently rehydrated by cooking or when incorporated into a moist food product. Ordinarily cheese and products incorporating cheese require refrigeration to preserve texture, flavor and odor, as well as to prevent spoilage. When cheese is used in the manufacture of commercial products, i.e. a cheese topping, such as in a pizza, it does not readily lend itself to use in automatic dispensing machines, since the freshly grated product tends to block in the hopper or agglomerate, preventing easy, accurate measurement of quantities to be applied to or mixed into the food product being manufactured.

Some spray dried cheese products have been prepared by admixing cheese with skim milk, phosphates and the like, followed by spray drying. This, while successful, is not a pure cheese product. Furthermore, spray drying results in the loss of volatiles which in turn results in a loss of the characteristic flavor and taste of the cheese product.

Freeze drying of cheese produces a satisfactory product but it is so expensive as to be prohibitive in commercial practice.

In my copending application there is described a process for drying of cheese. While this process is eminently suitable for drying of cheeses of the class described, certain cheeses, specifically asiago and fontina, still show separation of fat when treated by the process herein described.

SUMMARY OF THE INVENTION

In one broad form the present invention is a process for preparing a high fat dried cheese of low moisture content and is stable in storage without deterioration at room temperature for extended periods of time. The product is especially characterized by rapid release of flavor when rehydrated. The product regains its original texture and aroma when mixed with water or otherwise rehydrated.

The process includes the steps of mixing a high fat cheese of normal moisture content with an emulsifier. The emulsifiers are broadly those which are approved for the addition to foodstuffs and include sorbitan mono-oleate, lactyl stearate, diglyceryl stearate, sorbitan stearate, polyethoxy derivatives of sorbitol esters, monoglyceryl stearate, and the like. The amount of emulsifier ranges from about $1/2$ to $1\,1/2\%$ based on dry cheese solids. Usually the emulsifier is incorporated into the cheese in a water solution and by mixing at elevated temperatures to melt the cheese.

The cheese emulsifier mixture is cooled, extruded in a ram type extruder in noodle form, using an orifice plate to produce a noodle diameter of up to $3/32$ inch. It has been found that larger noodle diameters unduly prolong the drying time and present problems in fat migration.

The extruded noodle is dried in a forced air drier at temperatures of up to 115° F., preferably from 80 to 110° F., to a final moisture content of about 17%. The drying time is up to about 8 hours.

The process of the invention is especially adapted for use with high fat cheeses or those which contain from 40 to 53% fat on a dry basis. The invention is especially concerned with the fontina and asiago cheeses, although cheeses, such as the blue cheeses (blue vein) are benefitted. The optimum moisture content of the final dried product varies somewhat, depending on the fat content of the cheese and type. An excessively dry cheese, i.e. below 3%, results in a product which is difficult to rehydrate.

DESCRIPTION OF THE PREFERRED EMBODIMENTS

The cheeses which may advantageously be processed by the methods of this invention are blue or blue vein cheeses, produced by culture of the organism *Penicillium roquefortii*, such as Roquefort and Gorgonzola. Asiago and fontina are especially suited to this process, since it represents a technique for drying which eliminates the problem of fat separation from the cheese during the drying process.

The following examples will illustrate carrying out the process of the present invention, using various cheeses.

The Federal Standards of identity for these cheese products are as follows:

|  | Minimum age, days | Max. moisture, percent | Minimum FDB* percent |
| --- | --- | --- | --- |
| Asiago | 30–60 | | 50 |
| Fontina | 60 | 42 | 50 |
| Gorgonzola | 90 | 42 | 50 |
| Blue cheeses | 60 | 46 | 50 |

*FOB: Fat, dry basis.

Fat content of cheeses as the term is used herein refers to determinations made by the Babcock Method.

The extrusion of the cheese into noodle form is accomplished by means of conventional extruders of the ram type (i.e. utilizing a positive piston action) equipped with an extruder plate having orifice diameters of up to about $3/32$ inch, preferably $1/32$ to $2/32$ inch. The extrusion is preferably carried out at a temperaure of from 40 to 72° F., since weeping (exudation of serum and/or fat) is a characteristic of excessive extrusion temperatures.

The drying is carried out in a forced air drier in which the extruded noodle is spread out in a porous bed on trays or endless wire mesh belts and passed through the drier. The air flow should pass freely through the porous bed of noodles. In a preferred embodiment the direction of the current of forced air is reversed at intervals during the drying process. The temperatures used are from 80 to 115° F., preferably 95 to 110° F., with preferred drying times of 2 to 6 hours, most preferably 2½ to 3½ hours. The temperature and time of drying depend somewhat on the fat content and/or texture of the particular cheese. The temperature and rate of drying must be such as to eliminate the browning tendency of some cheese products, fat exudation or overdrying. The cheese is preferably dried to a final moisture content of from 3 to 12%, most preferably 3 to 7.5%. The moisture contents are those values obtained by the toluene distillation method.

EXAMPLE 1

One hundred forty-four parts by weight of fontina, representing 100 parts of cheese on a dry solids basis, is broken up and placed in a jacketed container heated with hot water. The cheese was heated with stirring to 125° F. until melted (jacket water 140° F.) and ten parts of a 10% emulsion or monoglyceryl stearate (Aldo) were added to produce a final emulsifier content of 1% on a dry cheese solids basis, and mixed at 125° F. for 20 minutes. The product was cooled down to 60° F. and the paste extruded at 60° F. in a ram type extruder equipped with an orifice plate having 2/32 inch orifices. The extruded noodles were deposited in a porous bed (1⅓ inches deep) in perforated trays and placed in a forced air drier. The noodles were dried for 3¼ hours at 110° F. During the drying the air current flow through the noodle bed was reversed at approximately 45 minute intervals. The dried fontina had a moisture content of about 7%.

EXAMPLE 2

One hundred thirty-five parts by weight of asiago, representing 100 parts of cheese on a dry solids basis, are broken up and placed in a jacketed container heated with hot water. The jacket water was maintained at 140° F. and the cheese melted and maintained at 125° F. with stirring. Ten parts of a 10% emulsion of monoglyceryl stearate (Aldo) were added to achieve a final emulsifier content of 1% on a dry cheeese solids basis and the mixture stirred at 125° F. for 20 minutes. The product was cooled down to 65° F. and the paste extruded at 65° F. in a ram type extruder equipped with an orifice plate having 2/32 inch orifices. The extruded noodle was arranged in perforated trays in a forced air drier and dried at 100° F. for 3 hours. During the drying the direction of the forced air flow through the porous bed of noodles (1½ inches deep) was reversed at 40 minute intervals to insure smooth drying. The final moisture content was about 6.5%.

The following table will illustrate various specific embodiments following the procedure of Examples 1 and 2.

|  | Example | | |
|---|---|---|---|
|  | 3 | 4 | 5 |
|  | Cheese | | |
|  | Fontina | Asiago | Roquefort |
|  | Fat content (original) (percent) | | |
|  | 50 | 50 | 52 |
|  | Emulsifier | | |
|  | Sorbitan mono-oleate | Sorbitan mono-stearate | Diglyceryl stearate |
| Percent emulsifier | 1½ | ½ | 1 |
| Drier temperature (° F.) | 110 | 95 | 105 |
| Drier time (hours) | 4.5 | 7 | 5 |
| Final moisture percent | 7 | 5 | 3.5 |

While several particular embodiments of this invention are shown above, it will be understood, of course, that the invention is not to be limited thereo, since many modifications may be made, and it is contemplated therefore by the appended claims to cover any such modifications as fall within the spirit and scope of this invention.

I claim:
1. A process for preparing a dried cheese that is storage stable without refrigeration which comprises:
   (a) admixing a high fat cheese selected from the group consisting of blue vein cheese, asiago and fontina with an emulsifying agent approved as a food additive,
   (b) extruding the admixture using a ram type extruder into a thin noodle form having noodle diameters of up to 3/32 inch, and
   (c) drying the noodles arranged in the form of a porous bed in a forced air drier at a temperature of up to 115° F. to a final moisture content of up to 17% over a period of up to 8 hours.
2. A process according to claim 1 wherein the emulsifier is present in the admixture in a concentration of from about ½ to 1½%.
3. A process according to claim 1 wherein the noodle diameter is from 1/32 to 3/32 inch.
4. A process according to claim 1 wherein the drying temperatures are from 80 to 115° F.
5. A process according to claim 1 wherein the initial fat content of the cheese is up to about 53%.
6. A process according to claim 1 wherein the initial fat content of the cheese is from about 42 to 53%.
7. A process according to claim 1 wherein the final moisture of the cheese is from 3 to 12%.
8. A process according to claim 1 wherein the drying time is from 2 to 6 hours.
9. A process according to claim 1 wherein the direction of the forced air flow through the porous bed is reversed at intervals during the drying process.
10. A process according to claim 1 wherein the emulsifier is selected from the group consisting of monoglyceryl stearate, sorbitan mono-oleate, lactyl stearate, diglyceryl stearate, sorbitan stearate and polyethoxy derivatives of soribtol esters.
11. A process according to claim 1 wherein the extrusion is carried out at a temperature of from about 40 to 70° F.

References Cited

UNITED STATES PATENTS

| 1,492,388 | 4/1924 | Popper | 99—115 |
| 1,997,866 | 4/1935 | Irvin | 99—115 |
| 3,421,904 | 1/1969 | Tatter et al. | 99—117 |
| 3,448,010 | 6/1969 | Pomper et al. | 99—96X |

OTHER REFERENCES

Kosikowski, F.: Cheese and Fermented Milk Foods, Edwards Brothers, Inc., Ann Arbor, Mich., 1966 (p. 5).

LIONEL M. SHAPIRO, Primary Examiner

D. M. NAFF, Assistant Examiner

U.S. Cl. X.R.

99—162, 199